United States Patent Office 3,431,869
Patented Mar. 11, 1969

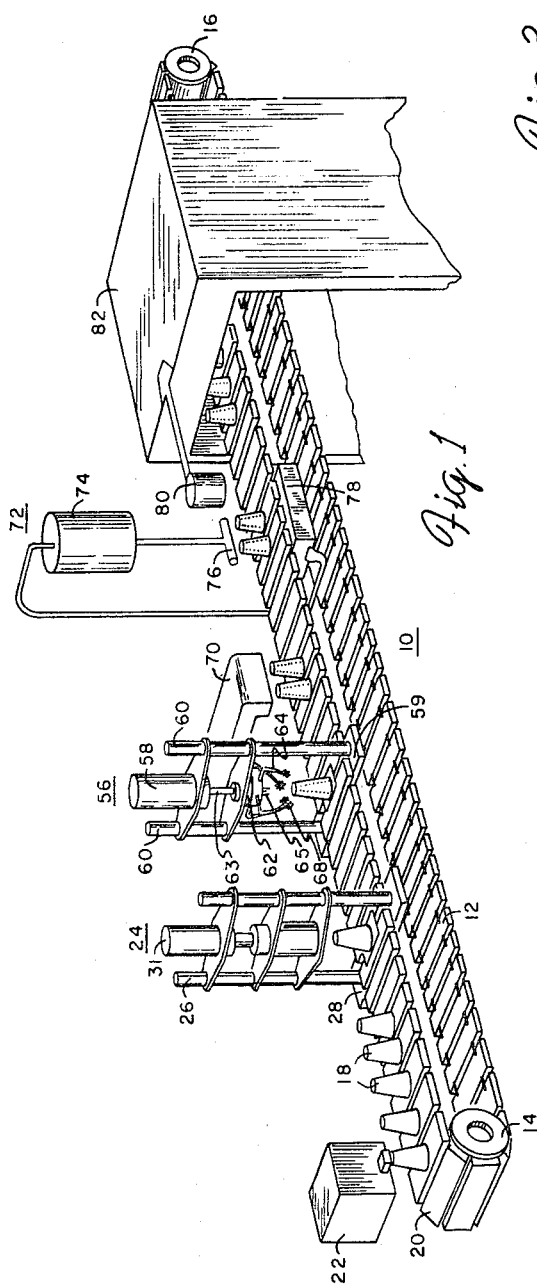
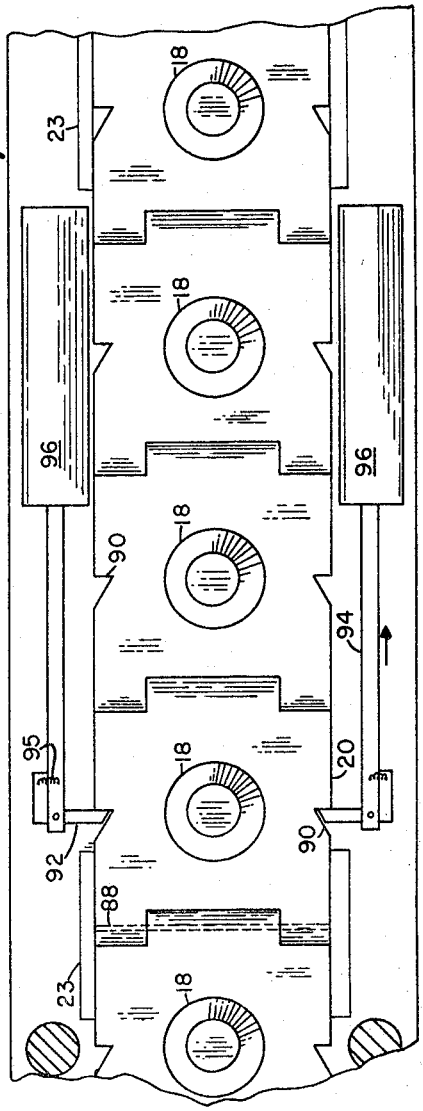
BARTON FRANK
*INVENTOR.*
ATTORNEY

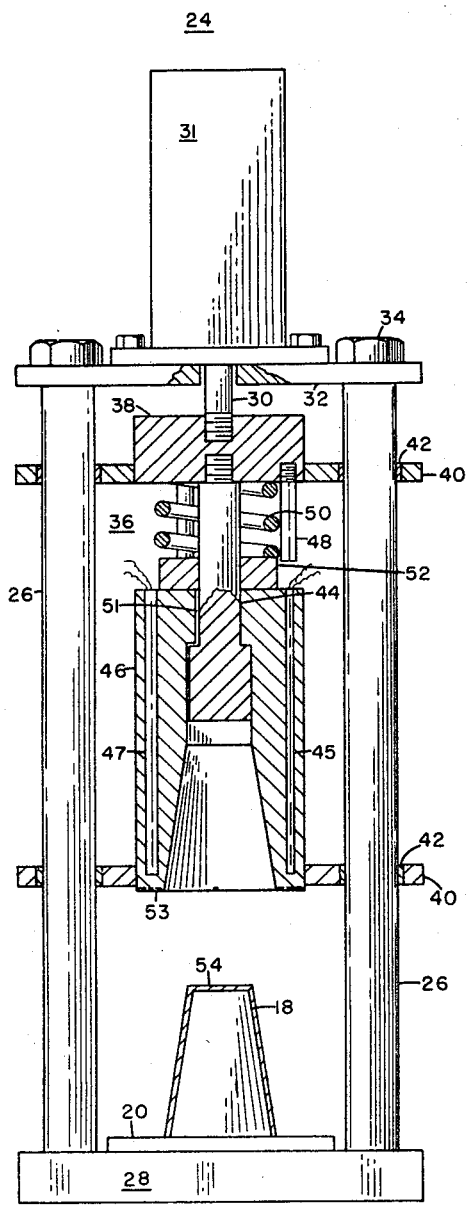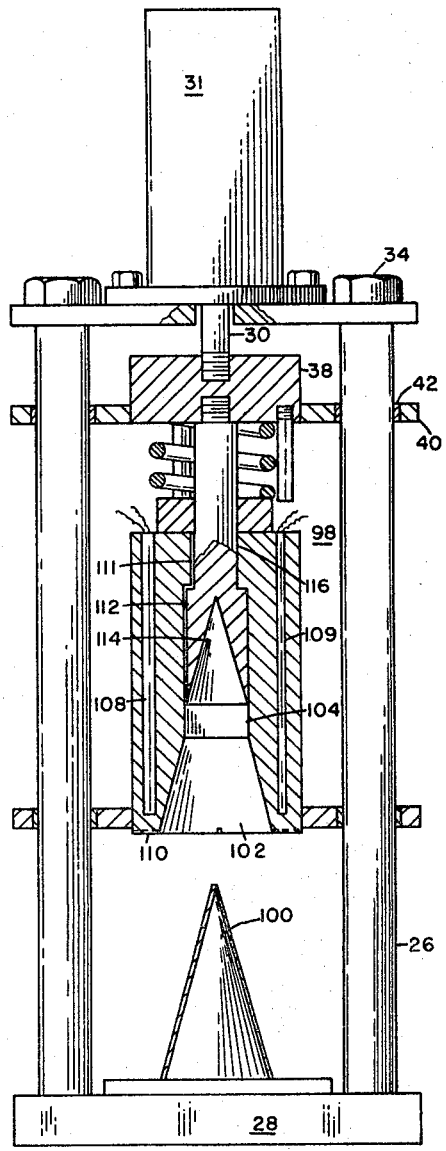

3,431,869
EDIBLE FOOD CONTAINER FORMING
MACHINE AND METHOD
Barton Frank, State College, Pa., assignor to
Henry Bloom, Pennsauken, N.J.
Filed Oct. 22, 1964, Ser. No. 405,674
U.S. Cl. 107—4     13 Claims
Int. Cl. A21b 5/02; A21c 11/00

ABSTRACT OF THE DISCLOSURE

This invention comprises a process and an endless belt machine for the making of an edible food container from pretzel dough, in which the dough is extruded on a male mold section, compressed between the male mold section and a female mold section to form a container. The lateral surface of this container is perforated, dryed by air blast, sprayed with hot caustic solution and baked. An endless belt conveyer machine is provided whereby these operations may be accomplished at various stations along said conveyor.

---

This invention relates to edible food containers and in particular to the method of making edible food containers from pretzel-like dough.

At the present time there are no processes or machinery available or known to the pretzel, cone making, or the baking industry for the production of a container made of pretzel composition. There are two principal differences between pretzel production and the processing of a container made to resemble a pretzel in taste, composition, texture, and finish. First, the formation of shape of the containers as opposed to forming a pretzel shape. My invention enables the forming of the container.

Second, the inability of a container formed from a pretzel-like dough to retain its shape during the normal cooking and baking operations necessary in pretzel making. My invention makes possible the retaining of the container shape without distortion through the cooking and baking cycles by the use of a supporting male mold section. This male mold section is a portion of an entire mold, comprised of both male and female sections, which is used to form the dough into a container shape. Thereafter upon removal of the female portion of the mold, the dough remains on the male section while it undergoes further processes.

Generally two types of cones are being produced by two processes. The wafer cone is made from a light batter which is poured between mold section and baked within the sections—as one make a waffle. This is not possible with a pretzel-like container because the dough cannot be poured and if it were to be baked within the mold sections steam would be trapped within the dough itself and force the dough out of the mold under high pressure and furthermore "cooking" would not be possible. The second type of cone presently produced is the rolled sugar cone. This is generally made by rolling out a high sugar content cake-like dough into thin sheets, baking the sheets, steaming the sheets until pliable, cutting the sheets into the proper shape, rolling the sheets into a conical shape, and drying. There is no provision for cooking or the necessary baking which is entailed in making a pretzel-like product.

It is an object of this invention to produce a novel food cone or cup comprised of pretzel dough for the containing of ice cream or related products but not limited to such products.

It is another object of this invention to produce a novel cone or cup which in combination with ice cream produces a new taste sensation, has greater strength in that it is less likely to crumble under the weight of the ice cream than containers presently produced, and that will have a pretzel finish or crust which will not as readily absorb moisture from ice cream, custard or similar contents.

It is still another object of this invention to describe a novel process for the manufacture of a cone or cup-like food container.

It is yet another object of this invention to describe a process by which ice cream cones or cups may be conveniently made out of viscous, heavy dough.

It is still another object of this invention to provide a novel dough press for use with heavy dough which after the pressing operation will retain the dough container form on a male mold.

It is another object of this invention to provide a novel press for the manufacture of edible food containers in which the molded dough is intactly formed upon a male mold with sufficient rigidity to be processed further through cooking and baking operations.

It is another object of this invention to describe a novel press for the manufacture of edible food containers having a "pie-type" dough to be used for containing various food products.

The means employed for carrying out this invention are described in detail hereinafter, pointed out in the appended claims, and illustrated by the accompanying drawings.

FIGURE 1 is a schematic view, partially in section, showing the main steps and machinery of the food container production process.

FIGURE 2 is a side view, partially in section, of the dough forming press adapted for a cup, pictured in FIGURE 1.

FIGURE 3 is a detailed view of a link section of the belt conveyor of FIGURE 1.

FIGURE 4 is a side view, partially in section, of a cone mold in the dough forming press of FIGURE 2.

Referring now to the drawings and in particular to FIGURE 1, 10 represents an endless belt type conveyor system with belt 12 circumferentially disposed about supporting wheels 14 and 16 which rotate on shafts. Male cup mold sections 18 are mounted upon conveyor belt plates 20 so as to be perpendicular to the links. A plurality of male cup mold sections 18 each mounted upon a conveyer belt plate 20 progresses from the position of wheel 14 to that of wheel 16 within which interval the dough cup is processed.

The process by which the edible food cones or cups are manufactured is comprised of the steps of: (1) placing a measured quantity of heavy viscous dough upon the apex portion of the male cup mold 18; (2) pressing this dough into a cup-like form; (3) perforating or puncturing the dough cup permitting the escape of steam; (4) drying the dough cup by air blast so as to harden the dough surface; (5) spraying the dough cup with hot caustic solution; (6) salting the dough cup; if a salted product is desired; and (7) baking the dough cup until edible.

All of these steps are performed upon the dough cup while it is positioned upon the male cup mold section 18 and progressing along on conveyer belt 12.

A description of the machines necessary to perform this process is given below. Dough extruder-cutter 22 is straddled above the male cup mold sections 18 moving on belt 12 between guides 23 which align belt links so as to deposit a measured quantity of dough upon the top portion of each mold section 18 as it passes by. In the case of the cup, the dough slug is merely dropped onto the base of the inverted male mold section. In the case of the cone, the dough slug is dropped onto the apex or point of the male mold section so that the point extends into the dough slug. Dough extruder-cutter 22 may be any of the conventional types of extruder-cutter devices used in the baking industry today, such as the twin screw extruder-cutter. The twin screw extruder-cutter consists of two opposed rods, screw like in construction, with a lead thread similar to a screw as we know it. These rods turn in opposite directions and are set side by side within a cavity enclosure or cylinder. A cross-sectional view would show the threaded screw rods lying longitudinally parallel to the floor within the cylinder wall. At the rear end of the cylinder there is an opening in the cavity over the two screw rods to accept the dough material (for pretzel cones). At the front end of the cylinder there is a "header attachment" with a cutter knife blade attached and a series of openings from the cylinder to the header and in the header itself to allow dough to be extruded through these openings and to be cut to size lengths as needed by the attached cutter knife blade.

Dough is fed into the rear cylinder opening by gravity and falls on to the screw rods. The screwing action of the screw rods forces the dough forward against the cylinder front end through the series of openings in the cylinder end. The dough continues extruding through these openings into the header which also has a series of corresponding openings whereby the dough comes out of the header similar to tooth paste form. The extruded dough is then cut off by the attached cutter knife blade mounted flush with the header which travels across the series of openings in the header, thereby cutting the extruded dough into proper lengths or slugs.

By timing the speed of the screws and the corresponding speed of the knife blade, then the number of slugs or cuts and their length can be controlled.

Referring now to FIGURES 1 and 2, dough press 24 is mounted by means of supporting rods 26 upon base 28 so as to be perpendicular to base 28. Belt 12 with male cup mold sections 18 passes over base 28 adjacent to the rod supports 26. A hydraulic or pneumatic cylinder 31 is attached to cylinder mount 32 by bolts. A piston rod 30 from pneumatic or hydraulic cylinder 31 passes vertically through cylinder mount 32 which is rigidly attached to supporting rods 26 by means of nuts 34 screwed upon supporting rods 26. Piston rod 30 is attached to the vertically slidable female mold section 36 of the press. More specifically, piston rod 30 is screw attached to mounting member 38 to which is attached guide 40 by a setscrew through which passes supporting rods 26. A bushing 42 is placed between each guide 40 and the supporting rod 26 to allow the mounting member 38 to slide easily upon rods 26. Vertically mounted compression rod 44 is screwably mounted to mounting member 38. Compression rod 44 slidably extends into and forms the upper portion of female mold section 46. Female mold section 46 is slidably mounted upon supporting rods 26 by means of guide 40 and bushings 42 as is mounting member 38. Female mold section 46 is electrically heated by cylindrical heating element 47 placed inside of female mold section 46; heaters being turned on and off by a thermo regulator 45 placed inside of mold section 46.

Downwardly disposed compression piston stops 48 are screwably attached to mounting member 38 and contain spring 50 which is compressed between mounting member 38 and stop washer 52. Stop washer 52 is slidably mounted about compression rod 44 and sized so that it will pass within compression piston stops 48 and compress spring 50 when the rods 48 are forced against the upper portion of female mold section 46. The female mold section cylinder 46 has two vent grooves, 51 at top of the female mold section cylinder and at the bottom of same marked 53.

The upper vent groove permits air to enter and escape on the stroke movement of rod 44 between the larger diameter of rod 44 and the smaller diameter of rod 44 within their respective cylinder cavities, as the rod moves in and out of the female mold section cylinder.

Female mold section cylinder 46 is forced downward by cylinder 31 on to male mold section 18. Dough which has been placed on the male mold section 18 is compressed fully around the contour of the male mold section 18. As the female mold section is completing its motion downward over the male mold section, air entrapped by the dough or any air between the female mold section and male mold section can escape through vent groove 53 at the bottom of female section 46. As the two molds, female and male, close together some of the dough will follow the air escaping through vent 53 and lie within the vent cavity, thus forming a slight ridge in the dough, so that when the female mold section retracts, the dough container which is left on the male mold, will appear with the ridge replacing the vent groove which has now been removed. Female mold section 46 has vent groove 51 in the upper part of the cylinder to permit air to enter and escape between larger diameter of compression piston 44 and the smaller diameter of cylinder during movement of compression piston in and out of female mold section 46. As dough is forced between the male and female molds, air in the mold cavity escapes through a vent groove 53 at bottom of female mold section. Slight excesses of dough may squeeze into air vent groove 53 and become part of container.

In the operation of the apparatus, male cup mold section 18, upon which is positioned a portion of dough, stops under female mold section 46. The piston rod 30 of hydraulic or pneumatic cylinder 31 is forced downwardly by the entering of air or oil into the cylinder 31, under pressure, through an orifice within the upper side of the piston head (not shown) allowing air or hydraulic oil to enter on top of piston forcing the piston within the cylinder 31 to move downward in turn moving female mold section downward 46 through its component parts.

Vice versa by a four way valve (not shown) air or oil is switched to enter bottom of cylinder 31, under pressure through an orifice in the bottom of cylinder 31, thereby forcing the piston within cylinder 31 upward which in turn motivates upwardly the female mold section 46 through its component parts. After of course both molds have been together and the dough container has been formed.

The rod 30 attached to piston within cylinder 31, its motion explained above, continues downwardly through rod guide 32 so as to force the female mold assembly 36 downward onto the male mold section 18. A portion of dough is then trapped between the female and male mold sections and a portion in female mold cylinder cavity. When the bottom portion of female mold section 46 strikes the belt link 20 it stops and compression rod 44 continues to travel into cylinder cavity in female mold section 46 forcing spring 50 to compress the entrapped dough to conform to the space between the male and female mold sections and forms a cup-like container of dough.

Piston rod 30 attached to cylinder 31 and motivated by the cylinder 31 moves upwardly withdrawing the female mold section 46 upwardly through its component parts. The piston 30 of hydraulic or pneumatic cylinder 31 is forced downwardly through rod guide 32 so as to force the female mold assembly 36 downward onto the male mold section 18. A portion of dough is then trapped between the female and male mold sections and a portion in female mold cylinder cavity. When the bottom portion of female mold section 46 strikes the belt link 20 it stops and compression rod 44 continues to travel into cylinder cavity in female mold section 46 forcing spring 50 to compress the entrapped dough to conform to the space between the male and female mold sections and forms a cup-like container of dough.

Piston rod 30 then withdraws causing compression rod 44 to move upward in the female mold section 46 and when it has reached its extreme upper position to draw female mold section 46 upward and away from male mold section 18, thus leaving a formed dough cup 54 upon the male mold section 18. The dough cup 54 does not stick to the female mold section 46 but remains upon the male mold section 18 because of the following: (1) the female mold section 46 is heated by electrical resistance element 47. This heating tends to produce a hard non-adhering outer surface to the dough cup 54 thus assisting in its release. (2) The initial separation of the lower portion of the compression rod 44 from the top dough cup 54 breaks surface tension and presents a smaller surface between female section 46 and the dough cup 54. (3) The inner portion of female mold section 46 is coated with a plastic such as Teflon designed to prevent sticking. Male mold section 18 may also have such a coating. (4) Gravity assists in retaining dough cup 54 to male mold section 18. After the female mold assembly 36 has withdrawn from the dough cup 54 the belt 12 with the male section then progresses to the next phase of the operation, the perforator 56.

The perforator 56 is mounted upon a hydraulic press 58 which in turn is attached to base 59 by means of supporting rods 60. The perforator 56 is so positioned that it is directly above the male mold section 18 and upon which is positioned dough cup 54 when the belt 12 stops in this position. Perforator 56 is comprised of a supporting member 62 which is attached to horizontal members which slide on vertical supporting rods 60, said horizontal members having bushings between the sliding surfaces to reduce friction. Supporting member 62 is attached screwably to piston rod 63 of the hydraulic press 58. Upon the lower portion of the supporting member 62 are disposed a number of downwardly disposed points 65 adapted to perforate the bottom of dough cup 54 when the supporting member 62 is lowered. Downwardly disposed flexible fingers 64 are attached to the supporting member 62. Upon the lower end portion of the flexible fingers 64 is mounted a vertically disposed rotable perforating wheel 68 upon the circumference of which are disposed a number of radial and outwardly disposed points. The number of flexible fingers and attached perforating wheels may vary from three to six, or more. In the manufacturing operation the perforating step is usually necessary only for cups, not necessary for cones although it may be used for cones as well.

In operation, the piston of hydraulic press 58 forces supporting member 62 and attached flexible fingers 64 downward when the male mold section 18 and attached dough cup 54 dwells beneath it. On the downward stroke of the press 58 the outwardly disposed points 65 on the lower end of the supporting member 62 perforate the inverted bottom portion of the dough cup and the perforating wheels 68 contact the lateral surface of the dough cup 54, rotate upon it and perforate the surface in vertical lines. These perforations or holes later allow the escape of steam when the dough cup 54 is baked. On the withdrawal of the perforating wheels 68, the belt 12 then continues its forward movement.

The dough cup 54 upon male mold section 18 then progresses to the air dryer 70. Air dryer 70 may be one of the conventional types available in the art which forces a blast of hot air upon the outer surface of the dough cup 54 producing a hard surface on the dough or "proofing" it.

The conveyor 10 then carries the dough cup 54 to the sprayer 72 which sprays a hot solution of sodium hydroxide upon the outer surface of the dough cup 54. The sprayer 72 is comprised of a tank 74, containing a hot sodium hydroxide solution in communication with spraying nozzles 76 which are positioned above the dough cup 54. The hot sodium hydroxide solution is forced by gravity or pump means (not shown) upon the dough cups 54. A retrieving pan 78 is positioned under the conveyer 10 to collect the excess sodium hydroxide solution and is in pump communication (not shown) with the tank 74 so as to pump the excess solution to the tank 74. The solution in the tank is heated by means of conventional gas or electric heating methods (not shown). Inlets in the tank permit addition of water and concentrated sodium hydroxide solution as well as retrieved solution. About a 1%–2% sodium hydroxide solution is used which is maintained at a temperature of about 210° F. A single dough cup 54 is exposed to this solution for a period of about 10 seconds.

The dough cup 54 then proceeds to the salter 80. The salter is one of those conventionally available in the art and is located above the dough cup 54 so as to salt its outside surface when this is desired. It is possible for the salting step to be left out of the process when an unsalted container is desired.

The dough cup 54 then progresses to the oven 82 where it is baked. The oven 82 is one of these conventionally available in the art and is so positioned that the top portion of conveyor 10 passes directly through it. The initial temperature of the oven is about 480–530° F.; the terminal temperature about 420° F. The dough cup 54 remains in the oven 82 for about 7–10 minutes. Upon leaving the oven 82 the cup 54 falls off male section 18 by gravity as it goes around wheel 16 and becomes inverted onto a conveyer (not shown) which takes it to packaging and distribution.

Referring now to FIGURE 3, the belt 12 of conveyer 10 is comprised of a plurality of plates 20 upon which is mounted the male mold section 18. Each plate 20 is linearly attached to an adjacent plate 20 by means of pins 88 which pass through both the adjacent end sections of the plate 20 and in such a way that the plates 20 will rotate about wheels 14 and 16 when the plates 20 reach this position. The outer lateral edges of the plates 20 have an angled recess 90 which is engaged by a dog 92 rotatably attached to rod 94. The rod 94 in turn is attached to the conveyer hydraulic piston 96 positioned to base 28 parallel to the belt 12. The dog 92 is so positioned upon conveyer rod 94 that upon rearward movement of the rod 94 the dog 92 will rotate against pressure of spring 95 when cammed by angular recess 90. The spring 95 keeps dog 92 in catch position. Forward movement of conveyer rod 94 will cause dog 92 to lock against angled recess 90. It should be noted that guide 23, recess 90, dog 92, rod 94, spring 95 and piston 96 are duplicated and positioned on either side of plate 20.

Although the description of the invention thus far has been directed toward the manufacture of a cup-like container, a cone container may be substituted therefor. FIGURE 4 shows the cone mold comprised of cone female mold section 98 and cone male mold section 100. These sections are interchangeable respectively with cup female mold section 46 and male mold cup section 18 in the dough forming press of FIGURE 2 and operates similarly.

The cone female section 98 is comprised of a vertically mounted cylindrical piece, the lower internal portion of which is comprised of a vertically mounted conical bore 102 which joins a smaller diameter cylindrical bore 104 at the upper portion thereof so as to pass vertically through female mold section 98. Female mold section 98 is supported by guides 40 in the same manner as cup female mold section 46. Within female mold section 98 is contained electrical resistance cylindrical heating element 108 and a thermo regulator 109 which are electrically connected to element 108 so as to maintain cone female mold section 98 at a uniform elevated temperature. The bottom edge of cone female mold section 98 contains radially disposed grooves 110 extending from the conical bore 102 to the outer edge of the section. These grooves 110 permit the escape of air during the compression stroke. A vertically disposed air groove 111 on the side of compression piece 112 extends from the upper part of cylindrical bore 104 to the top surface of section 98 to allow air intake during the compression stroke.

Compression piece 112 is slidably positioned within cylindrical bore 104 and has an internal conical bore 114 which mates with conical bore 102 when compression piece 112 is at its lowest position. The upper portion of compression piece 112 is attached to vertically positioned compression rod 116, the upper end of which is attached to mounting member 38. Cone male mold section 100 is attached to belt 12 in a manner similar to male cup mold section 18. The operation of the cone mold within the dough press is similar to that of the cup mold previously described.

The operation of the pistons 96 cause the conveyor 10 to move. Forward movement of the piston rod 94 causes dog 92 to engage angular recess 90 and to force plate 20 forward thus dragging the entire belt 12. Rearward movement of conveyor rod 94 will extend spring 95 and allow dogs 92 to rotate to the angled recess 90 of the adjacent plate 20 and to engage it. Hence a reciprocating motion of conveyor rod 94 will cause the conveyor 10 to move forward, dwell, and move forward again. The cycle time found most convenient for the conveyor 10 is for the belt 12 to move forward in one second, dwell for two seconds, and then move forward in another second. Thus the strokes of the press 24 and 58 may be synchronized to cycle downward in one second, immediately cycle upward in another second and dwell for one second while the belt 12 moves to the next position.

Although the present description and drawings indicate a single conveyer system, it is within the contemplation of this invention that multiple adjacent conveyer lines be used. These multiple lines consist of completely separate machinery, with the exception of the pulleys. These lines, positioned adjacent to each other move independently through the common oven. This permits a breakdown of one or more lines without affecting the others.

The food container found most satisfactory for the operation of the above described process is made of pretzel dough, that is dough conventionally used to produce salted pretzels. This dough is of a viscous composition and is generally comprised of the following ingredients:

| Ingredient: | Percentage (by weight) |
| --- | --- |
| Wheat flour | 66⅔ |
| Water | 23⅓ |
| Shortening | 6⅔ |
| Malt | 3⅓ |

The ingredients are stirred together and kneaded until a homogeneous viscous dough is formed. If the proofing and cooking operations are eliminated from the process, a container product having a composition, taste, and texture similar to that of pie crust is obtained and can be used to contain other food products.

The pretzel container with ice cream when eaten together produces an unexpected taste sensation from the contrasting pretzel flavor with sweet ice cream. Furthermore the container has more strength than the conventional ice cream cone so that it will not crumble under the weight of ice cream while being eaten. The product is low in calories, has no sugar, hence no difficulty is encountered by the carbonization of the hot molds (due to sugar) normally a problem in cone baking industry.

It is understood that the invention as previously described in the specification and drawings and in the claims is given by way of example only and that numerous modifications may be used without departing from the spirit of the invention.

I claim:

1. A process for producing edible food containers which comprises in combination the steps of:
   extruding viscous pretzel dough on the surface of a male mold;
   compression of the dough between said male mold and a female mold so as to form a dough container;
   perforating the lateral surface and bottom of the dough container;
   air drying the dough container;
   spraying the dough container with a hot sodium hydroxide solution;
   salting the outer surface of the dough container;
   and baking the dough container to form an edible product.

2. The process as claimed in claim 1 in which a 1%–2% solution of sodium hydroxide is used at about 210° F. to spray the container.

3. A process for producing edible food containers which comprises in combination the steps of:
   extruding viscous pretzel dough on the surface of a male mold;
   compression of the dough between said male mold and a female mold so as to form an edible dough container;
   perforating the lateral surface and bottom of the dough container;
   air drying the dough container;
   spraying the dough container with a 1%–2% hot sodium hydroxide solution at a temperature of about 210° F.;
   and baking the dough container to form an edible product.

4. The process as claimed in claim 3 in which the dough container is baked in an oven at a temperature of from 420–530° F. for about 10 minutes.

5. A device which produces edible food containers formed of pretzel dough comprising a plurality of male mold sections and a single female mold section:
   an endless belt conveyer system upon which are mounted said male mold sections;
   a dough extruder positioned at a first station adjacent one of the male mold sections upon said conveyer system adapted to disposing a given quantity of dough upon said male mold section;
   a compression device positioned at a second station on said conveyer system, to force said female mold against each quantity of dough extruded upon successive male sections to mold same into a dough container;
   a perforating device positioned as a third station upon said conveyer system adapted to perforate the lateral sides of said food container;
   an air blowing device positioned at a fourth station upon said conveyer system adapted to dry said molded container and harden the surface thereon;
   a spraying device positioned at a fifth station upon said conveyer system adapted to immerse said dough container with hot caustic solution; and
   a baking oven positioned at a sixth station upon said conveyer system adapted to bake said dough container to an edible food product.

6. The combination as claimed in claim 5 in which a salting device is positioned at a seventh station between said spraying device and said baking oven for the purpose of sprinkling said dough container with salt.

7. The combination as claimed in claim 6 in which said compression device comprises:
   a movable compression rod comprising the upper portion of said female mold section adapted to compress dough between said male and said female mold section after said female mold section has engaged said male mold section.

8. The combination as claimed in claim 7 in which said compression rod is spring loaded.

9. A press for the production of an edible pretzel dough food container comprising in combination:
   a male mold section;
   a female mold section positioned on said press above said male mold section;
   a compression rod slidably positioned within said female mold section so as to form the end portion of said female mold section;
   a compression spring positioned on said compression rod adapted to urge said female mold section into a predetermined position upon said compression rod;
   a press mechanism adapted to force said compression rod and said female mold section upon said male mold section, whereby when said female mold section is seated against said male mold section, said compression rod will be driven by said press mechanism to slide in said female mold section forcing pretzel dough contained therebetween into the space between said mold sections.

10. A process of injecting and shaping non-flowable dough in a press having male and female mold sections and dough contacting surfaces thereon, an orifice in said female section communicating with the dough contacting surfaces thereon and having a movable compression member therein comprising the steps of depositing a slug of said dough upon the upper end of the male mold section, moving said female mold section downwardly upon the male section to entrap the dough slug between the dough contacting surfaces and in said orifice and then moving said member downwardly to expel the dough trapped in said orifice and close the orifice whereby the dough will be injected between the dough contacting surfaces as the orifice is closed during downward movement of said female mold section.

11. The process of claim 10 in which:
the compression member's dough contacting surface forms a surface of a dough container.

12. The process of claim 11 including the further step of:
heating the female section of the mold to cause the dough to release from the female mold section.

13. A dough press comprising in combination:
a male mold section and a female mold section having a forming surface including a cylindrical cavity coacting with said male mold section to force dough trapped therebetween into said cavity while shaping it into an edible container;
a compression member mounted in said cavity and thereby supporting said female mold section for relative sliding movement thereon as it engages said male mold section;
whereby the dough filling said cavity is expelled by said member to complete the formation of said container.

References Cited
UNITED STATES PATENTS

| | | | |
|---|---|---|---|
| 1,851,578 | 3/1932 | Heyman | 107—54 |
| 1,097,576 | 5/1914 | Winder | 107—66 |
| 2,004,530 | 6/1935 | Howe et al. | 107—1 |

WALTER A. SCHEEL, *Primary Examiner.*

JOSEPH SHEA, *Assistant Examiner.*

99—89, 137; 107—15, 43, 54, 58